US012371027B2

(12) United States Patent
Vasoya et al.

(10) Patent No.: US 12,371,027 B2
(45) Date of Patent: Jul. 29, 2025

(54) VEHICULAR DRIVING ASSIST SYSTEM WITH TRAFFIC JAM PROBABILITY DETERMINATION

(71) Applicant: Magna Electronics Inc., Auburn Hills, MI (US)

(72) Inventors: Jigneshkumar Natvarlal Vasoya, Gujarat (IN); Kirti Hiranand Balani, Maharashtra (IN); Vishalkumar Madhusudan Mehta, Gujarat (IN); Pushpendra Kushwaha, Uttar pradesh (IN)

(73) Assignee: Magna Electronics Inc., Auburn Hills, MI (US)

( * ) Notice: Subject to any disclaimer, the term of this patent is extended or adjusted under 35 U.S.C. 154(b) by 978 days.

(21) Appl. No.: 16/947,867

(22) Filed: Aug. 21, 2020

(65) Prior Publication Data

US 2021/0053572 A1  Feb. 25, 2021

Related U.S. Application Data

(60) Provisional application No. 62/890,708, filed on Aug. 23, 2019.

(51) Int. Cl.
*B60W 40/04* (2006.01)
*G06N 7/00* (2023.01)
*G08G 1/01* (2006.01)

(52) U.S. Cl.
CPC ............ *B60W 40/04* (2013.01); *G06N 7/00* (2013.01); *G08G 1/0133* (2013.01);
(Continued)

(58) Field of Classification Search
CPC ............ B60W 40/04; B60W 2420/42; B60W 2420/52; B60W 2552/05; B60W 2552/10;
(Continued)

(56) References Cited

U.S. PATENT DOCUMENTS

| 5,550,677 A | 8/1996 | Schofield et al. |
| 5,670,935 A | 9/1997 | Schofield et al. |

(Continued)

FOREIGN PATENT DOCUMENTS

| WO | WO-2020259074 A1 * | 12/2020 | ............ G08G 1/0175 |

*Primary Examiner* — Ramya P Burgess
*Assistant Examiner* — Chanmin Park
(74) *Attorney, Agent, or Firm* — HONIGMAN LLP (57) ABSTRACT

A vehicular driving assist system includes at least one sensor disposed at a vehicle and having a field of sensing exterior of the vehicle. An ECU includes circuitry and associated software, with the circuitry including a data processor for processing sensor data captured by the sensor to detect presence of objects in the field of sensing of the sensor. The ECU, responsive to processing by the data processor at the ECU of sensor data captured by the sensor, determines traffic attributes for a plurality of traffic lanes of a road the vehicle is travelling along. The ECU, responsive to determining the traffic attributes determines a predicted traffic value based on the traffic attributes and an output from a trained prediction model. The ECU, responsive to determining the predicted value, determines a traffic jam probability for at least one traffic lane based on the predicted value and the respective traffic attributes.

29 Claims, 4 Drawing Sheets

| Traffic Scenario and Environment | | |
|---|---|---|
| Traffic Scenario | Environment Detail | |
| 1. No traffic<br>2. Slow moving<br>3. Stop & Go<br>4. Stop/Halt | 1. | Host & Target vehicle' speed variation (e.g. Constant, Variable) |
| | 2. | Host & Target vehicle' speed range (e.g. 0kmph to 80kmph) |
| | 3. | Number of object(s) (e.g. 0 to 20) |
| | 4. | Number of road lane(s) (e.g. 1 to 3) |
| | 5. | Distance between target vehicles (e.g. 1m to 10m) |
| | 6. | Distance between host (ego) and target vehicle (e.g. 0m to 100m) |
| | 7. | Lane merging (e.g. 3 lanes merge into 2 lanes) |
| | 8. | Lane change of host and/or target |

(52) U.S. Cl.
CPC . *B60W 2420/403* (2013.01); *B60W 2420/408* (2024.01); *B60W 2552/05* (2020.02); *B60W 2552/10* (2020.02); *B60W 2554/406* (2020.02); *B60W 2554/408* (2020.02)

(58) Field of Classification Search
CPC ...... B60W 2554/406; B60W 2554/408; G06N 7/00; G08G 1/0133
See application file for complete search history.

(56) References Cited

U.S. PATENT DOCUMENTS

| | | | |
|---|---|---|---|
| 5,949,331 | A | 9/1999 | Schofield et al. |
| 6,587,186 | B2 | 7/2003 | Bamji et al. |
| 6,674,895 | B2 | 1/2004 | Rafii et al. |
| 6,678,039 | B2 | 1/2004 | Charbon |
| 6,690,268 | B2 | 2/2004 | Schofield et al. |
| 6,690,354 | B2 | 2/2004 | Sze |
| 6,693,517 | B2 | 2/2004 | McCarthy et al. |
| 6,710,770 | B2 | 3/2004 | Tomasi et al. |
| 6,824,281 | B2 | 11/2004 | Schofield et al. |
| 6,825,455 | B1 | 11/2004 | Schwarte |
| 6,876,775 | B2 | 4/2005 | Torunoglu |
| 6,906,793 | B2 | 6/2005 | Bamji et al. |
| 6,919,549 | B2 | 7/2005 | Bamji et al. |
| 7,038,577 | B2 | 5/2006 | Pawlicki et al. |
| 7,053,357 | B2 | 5/2006 | Schwarte |
| 7,157,685 | B2 | 1/2007 | Bamji et al. |
| 7,176,438 | B2 | 2/2007 | Bamji et al. |
| 7,203,356 | B2 | 4/2007 | Gokturk et al. |
| 7,212,663 | B2 | 5/2007 | Tomasi |
| 7,283,213 | B2 | 10/2007 | O'Connor et al. |
| 7,310,431 | B2 | 12/2007 | Gokturk et al. |
| 7,321,111 | B2 | 1/2008 | Bamji et al. |
| 7,340,077 | B2 | 3/2008 | Gokturk et al. |
| 7,352,454 | B2 | 4/2008 | Bamji et al. |
| 7,375,803 | B1 | 5/2008 | Bamji |
| 7,379,100 | B2 | 5/2008 | Gokturk et al. |
| 7,379,163 | B2 | 5/2008 | Rafii et al. |
| 7,405,812 | B1 | 7/2008 | Bamji |
| 7,408,627 | B2 | 8/2008 | Bamji et al. |
| 7,480,149 | B2 | 1/2009 | DeWard et al. |
| 7,580,795 | B2 | 8/2009 | McCarthy et al. |
| 7,720,580 | B2 | 5/2010 | Higgins-Luthman |
| 7,855,755 | B2 | 12/2010 | Weller et al. |
| 8,013,780 | B2 | 9/2011 | Lynam |
| 8,027,029 | B2 | 9/2011 | Lu et al. |
| 8,256,821 | B2 | 9/2012 | Lawlor et al. |
| 9,036,026 | B2 | 5/2015 | Dellantoni et al. |
| 9,146,898 | B2 | 9/2015 | Ihlenburg et al. |
| 9,487,159 | B2 | 11/2016 | Achenbach |
| 9,575,160 | B1 | 2/2017 | Davis et al. |
| 9,596,387 | B2 | 3/2017 | Achenbach et al. |
| 9,599,702 | B1 | 3/2017 | Bordes et al. |
| 9,689,967 | B1 | 6/2017 | Stark et al. |
| 9,753,121 | B1 | 9/2017 | Davis et al. |
| 9,871,971 | B2 | 1/2018 | Wang et al. |
| 9,896,039 | B2 | 2/2018 | Achenbach et al. |
| 10,071,687 | B2 | 9/2018 | Ihlenburg et al. |
| 10,099,614 | B2 | 10/2018 | Diessner |
| 2009/0295181 | A1 | 12/2009 | Lawlor et al. |
| 2010/0245066 | A1 | 9/2010 | Sarioglu et al. |
| 2012/0062743 | A1 | 3/2012 | Lynam et al. |
| 2012/0218412 | A1 | 8/2012 | Dellantoni et al. |
| 2013/0222592 | A1 | 8/2013 | Gieseke |
| 2014/0160284 | A1 | 6/2014 | Achenbach et al. |
| 2014/0218529 | A1 | 8/2014 | Mahmoud et al. |
| 2014/0226012 | A1 | 8/2014 | Achenbach |
| 2014/0375476 | A1 | 12/2014 | Johnson et al. |
| 2015/0015713 | A1 | 1/2015 | Wang et al. |
| 2015/0124096 | A1 | 5/2015 | Koravadi |
| 2015/0158499 | A1 | 6/2015 | Koravadi |
| 2015/0251599 | A1 | 9/2015 | Koravadi |
| 2015/0327398 | A1 | 11/2015 | Achenbach et al. |
| 2015/0352953 | A1 | 12/2015 | Koravadi |
| 2016/0036917 | A1 | 2/2016 | Koravadi et al. |
| 2016/0210853 | A1 | 7/2016 | Koravadi |
| 2016/0335890 | A1* | 11/2016 | Bernhardt .......... G01C 21/3492 |
| 2017/0222311 | A1 | 8/2017 | Hess et al. |
| 2017/0254873 | A1 | 9/2017 | Koravadi |
| 2017/0276788 | A1 | 9/2017 | Wodrich |
| 2017/0315231 | A1 | 11/2017 | Wodrich |
| 2017/0356994 | A1 | 12/2017 | Wodrich et al. |
| 2018/0015875 | A1 | 1/2018 | May et al. |
| 2018/0045812 | A1 | 2/2018 | Hess |
| 2018/0231635 | A1 | 8/2018 | Woehlte |
| 2019/0299968 | A1* | 10/2019 | Morita ................. B60W 10/08 |
| 2021/0049373 | A1* | 2/2021 | Vladimerou ....... G01C 21/3461 |

* cited by examiner

FIG. 1

| Traffic Scenario / Flow Rate \ Density | No Traffic | Slow Moving | Stop & Go | Stop |
|---|---|---|---|---|
|  | 0.05 | 0.44 | 0.89 | 1 |
| High Collective Velocity (0.2 ≈ 80kmph) | | | | |
| High (1) | 0.10 | 0.25 | NA | NA |
| Medium (0.56) | 0.05 | 0.16 | NA | NA |
| Low (0.23) | 0.01 | 0.08 | NA | NA |
| Medium Collective Velocity (0.75 ≈ 30kmph) | | | | |
| High (1) | 0.20 | 0.50 | NA | NA |
| Medium (0.56) | 0.15 | 0.30 | NA | NA |
| Low (0.23) | 0.10 | 0.15 | NA | NA |
| Low Collective Velocity (0.85 ≈ 15kmph) | | | | |
| High (1) | NA | 0.75 | 0.85 | NA |
| Medium (0.56) | NA | 0.50 | 0.60 | NA |
| Low (0.23) | NA | 0.25 | 0.35 | NA |
| Very Low Collective Velocity (0.9 < 10kmph) | | | | |
| High (1) | NA | NA | 0.95 | 1.00 |
| Medium (0.56) | NA | NA | 0.70 | 0.75 |
| Low (0.23) | NA | NA | 0.40 | 0.50 |

FIG. 2

| Model Coefficients | | | | | | | | | |
|---|---|---|---|---|---|---|---|---|---|
| $c_0$ | $c_1$ | $c_2$ | $c_3$ | $c_4$ | $c_5$ | $c_6$ | $c_7$ | $c_8$ | $c_9$ |
| 0.0143 | 0.3637 | 0.1135 | -0.8836 | 0.3984 | 0.3020 | 0.2312 | -0.2553 | -0.1636 | 1.0421 |

FIG. 3

| Traffic Scenario and Environment | |
|---|---|
| Traffic Scenario | Environment Detail |
| 1. No traffic<br>2. Slow moving<br>3. Stop & Go<br>4. Stop/Halt | 1. Host & Target vehicle' speed variation (e.g. Constant, Variable)<br>2. Host & Target vehicle' speed range (e.g. 0kmph to 80kmph)<br>3. Number of object(s) (e.g. 0 to 20)<br>4. Number of road lane(s) (e.g. 1 to 3)<br>5. Distance between target vehicles (e.g. 1m to 10m)<br>6. Distance between host (ego) and target vehicle (e.g. 0m to 100m)<br>7. Lane merging (e.g. 3 lanes merge into 2 lanes)<br>8. Lane change of host and/or target |

FIG. 4

VEHICULAR DRIVING ASSIST SYSTEM WITH TRAFFIC JAM PROBABILITY DETERMINATION

CROSS REFERENCE TO RELATED APPLICATION

The present application claims the filing benefits of U.S. provisional application Ser. No. 62/890,708, filed Aug. 23, 2019, which is hereby incorporated herein by reference in its entirety.

FIELD OF THE INVENTION

The present invention relates generally to a vehicle vision system for a vehicle and, more particularly, to a vehicle vision system that utilizes one or more cameras at a vehicle.

BACKGROUND OF THE INVENTION

Use of imaging sensors in vehicle imaging systems is common and known. Examples of such known systems are described in U.S. Pat. Nos. 5,949,331; 5,670,935 and/or 5,550,677, which are hereby incorporated herein by reference in their entireties.

SUMMARY OF THE INVENTION

The present invention provides a driver assistance system or vision system or imaging system for a vehicle that utilizes one or more sensors (e.g., one or more CMOS cameras, one or more radar sensors, one or more lidar sensors, etc.) to capture sensor data from exterior of the vehicle, and provides an ECU including electronic circuitry and associated software. The circuitry of the ECU includes a data processor for processing sensor data captured by the at least one sensor to detect presence of objects in the field of sensing of the sensor, and the ECU, responsive to processing by the data processor at the control of sensor data captured by the sensor, determines traffic attributes for each traffic lane of a plurality of traffic lanes of a road the vehicle is travelling along. Responsive to determining the traffic attributes, the ECU determines a predicted traffic value based on the traffic attributes and an output from a trained prediction model. Responsive to determining the predicted traffic value, the ECU determines a traffic jam probability for each traffic lane ahead of the road ahead of the equipped vehicle based on the predicted traffic value and the respective traffic attributes.

These and other objects, advantages, purposes and features of the present invention will become apparent upon review of the following specification in conjunction with the drawings.

DESCRIPTION OF THE PREFERRED EMBODIMENTS

A vehicle vision system and/or driver assist system and/or alert system operates to capture images exterior of the vehicle and may process the captured image data to display images and to detect objects at or near the vehicle and in the predicted path of the vehicle, such as to assist a driver of the vehicle in maneuvering the vehicle in a rearward direction. The vision system includes an image processor or image processing system that is operable to receive image data from one or more cameras (or other non-imaging sensors such as radar sensors and/or lidar sensors) and provide an output to a display device for displaying images representative of the captured image data.

Figure 1:
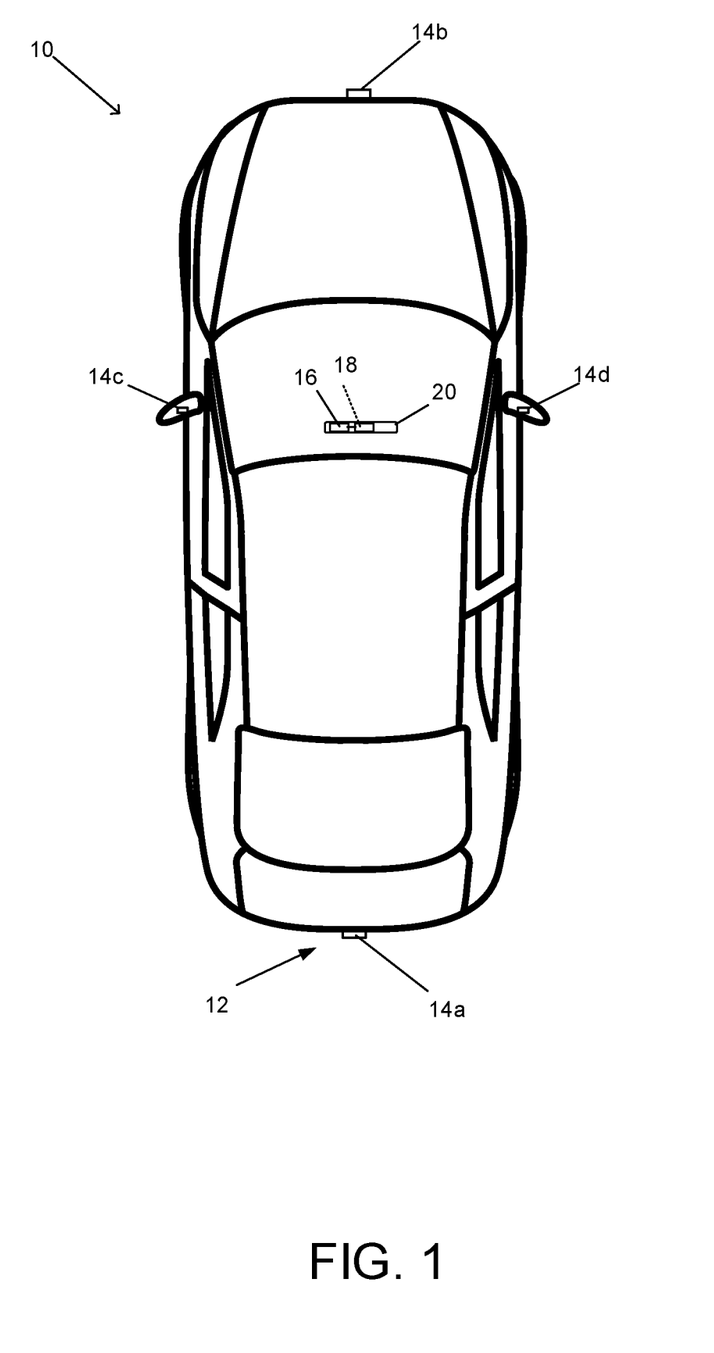
FIG. 1 is a plan view of a vehicle with a vision system that incorporates cameras in accordance with the present invention.

Referring now to the drawings and the illustrative embodiments depicted therein, a vehicle 10 includes an imaging system or vision system 12 that includes at least one exterior viewing imaging sensor or camera (e.g., one or more radar sensors, one or more lidar sensors, etc.), such as a rearward viewing imaging sensor or camera 14a (and the system may optionally include multiple exterior viewing imaging sensors or cameras, such as a forward viewing camera 14b at the front (or at the windshield) of the vehicle, and a sideward/rearward viewing camera 14c, 14d at respective sides of the vehicle), which captures images exterior of the vehicle, with the camera having a lens for focusing images at or onto an imaging array or imaging plane or imager of the camera (FIG. 1). Optionally, a forward viewing camera may be disposed at the windshield of the vehicle and view through the windshield and forward of the vehicle, such as for a machine vision system (such as for traffic sign recognition, headlamp control, pedestrian detection, collision avoidance, lane marker detection and/or the like). The vision system 12 includes a control or electronic control unit (ECU) 18 that includes electronic circuitry and associated software, with the electronic circuitry including a data processor that is operable to process image data captured by the camera or cameras (or to process sensor data captured by a non-imaging sensor, such as a radar sensor or lidar sensor or the like) and may detect objects or the like and/or provide displayed images at a display device 16 for viewing by the driver of the vehicle (although shown in FIG. 1 as being part of or incorporated in or at an interior rearview mirror assembly 20 of the vehicle, the control and/or the display device may be disposed elsewhere at or in the vehicle). The data transfer or signal communication from the camera to the ECU may comprise any suitable data or communication link, such as a vehicle network bus or the like of the equipped vehicle.

Traffic congestion is a major issue that many metropolises face. Traffic congestion wastes time and energy, causes pollution and stress, decreases productivity and imposes costs on society. Factors such as accidents, vehicle breakdowns, improper synchronized traffic signals, special events (e.g., social gatherings, sporting events, rallies, etc.), bad weather conditions, etc. cause a variety of traffic congestion scenarios.

Various features of autonomous vehicles or semi-autonomous vehicles (i.e., vehicles capable of at least partially controlling driving functions such as steering, braking, and acceleration) are used to detect various traffic scenarios and to alert, assist and facilitate a driver and/or passenger of the vehicle and potentially aid in making a vehicle semi or fully autonomous.

Traffic jams are often very frustrating and painful for drivers. By measuring traffic jam probability and feeding the measurement to features of the autonomous or semi-autonomous vehicle such as adaptive cruise control (ACC) and/or lane keep/change assist or other driver assistance systems, user convenience and safety along with vehicle productivity (e.g., fuel economy) may be improved.

Systems and methods of the present invention determine real-time traffic jam probability using at least one front or forward sensing sensor (e.g. a radar sensor and/or a lidar sensor and/or a camera) installed at the vehicle. The system determines or calculates road attributes for each traffic lane of the current road. For example, the system may determine traffic density, traffic flow rate, collective velocity, and longitudinal distance between the host vehicle and a target vehicle. These road attributes may accurately describe the traffic on the road along which the equipped vehicle is traveling. The system prepares synthetic data of the determined attributes using subjective opinions of one or more observers (e.g., human annotators) for different possible traffic scenarios. For example, the subjective opinion (i.e., based upon their opinion of traffic in the images and not based on any empirical measurements) of three or more observers may be included. The system, in some implementations, trains a quadratic linear model on the prepared synthetic data and predicts traffic jam probability on a lane-by-lane basis (i.e., a probability of a traffic jam for each lane individually). The system may calculate the overall traffic jam probability by averaging the probability of each traffic lane.

The system, in some implementations, determines the traffic jam probability in three primary steps. In one step, the system calculates traffic attributes for each traffic lane. For example, traffic may be measured by number of objects (i.e., other vehicles) ahead of the ego (i.e., host) vehicle (or behind, or around), their speed relative to the ego vehicle, and their distance from ego vehicle. Using these measurements, the system determines different traffic attributes such as traffic density, flow rate, collective velocity, and longitudinal distance between the host vehicle and the object.

For example, the system may determine traffic density $D_k$ of an individual lane of a road the vehicle is travelling along using Equation (1), where $F_D$ is a normalization factor for density, R is a distance range ahead of the host vehicle, N is the total number of vehicles in a lane within distance range R, and $L_v$ is the length of the vehicle. Traffic density is defined as a measure of total occupied length of vehicles within the distance range R.

$$D_k = \left(\frac{F_d}{R}\right) * \sum_{v=1}^{N} L_v \quad (1)$$

The system may determine flow rate $F_k$ of an individual lane of the road the vehicle is travelling along using Equation (2), where $F_F$ is a normalization factor for flow rate and $S_v$ is the speed or velocity of the vehicle. Flow rate is defined as a measure of the number of vehicles able to move a certain distance within a defined time duration (i.e., how quickly the vehicles are moving). The absolute speed of objects (i.e., other vehicles) may be determined using the relative speed of the object to the host vehicle.

$$F_k = F_F * \sum_{v=1}^{N} f(S_v) \text{ Where } f(S_v) = \begin{cases} 1, S_v \geq 10 \\ 0, S_v < 10 \end{cases} \quad (2)$$

The system may determine a collective velocity $V_k$ of the vehicles on an individual lane of the road the vehicle is travelling along using Equation (3), where $F_v$ is a normalization factor for velocity. Collective velocity is defined as a measure of the average absolute velocity of all vehicles within the range R of the host vehicle.

$$V_k = \left(\frac{1}{F_v}\right) * \left(\frac{1}{N}\right) * \sum_{v=1}^{N} S_v \quad (3)$$

The system may determine a normalized longitudinal distance $L_k$, where $D_v$ is the longitudinal distance or length of the host vehicle. Normalized longitudinal distance is defined as the ratio of minimum longitudinal distance to distance range R.

$$L_k = \left(\frac{1}{R}\right) * \text{MIN}[D_v] \text{ Where } v = 1 \text{ to } N \quad (4)$$

Figure 2:
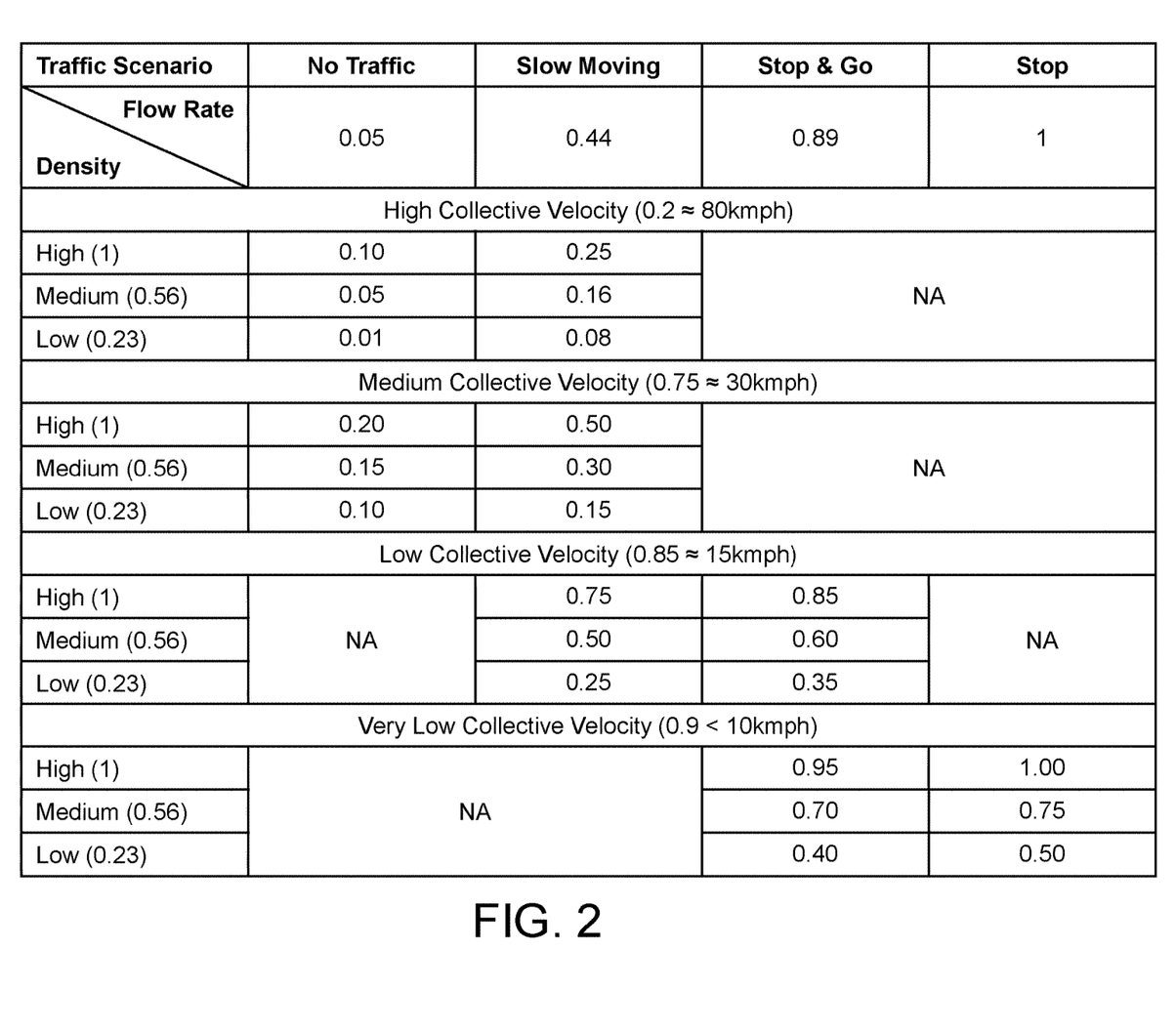
FIG. 2 is a table of permutations for traffic jam probability.

In another step, the system generates a linear regression prediction model. The system generates the model, in some examples, through data annotation and model training. During the data annotation phase, a training dataset is prepared and categorized into different possible traffic scenarios. For example, traffic categories may include "no traffic", "slow moving", "stop and go", and "stop/halt". A contributing probability of a traffic jam for considered attributes is categorized as "High", "Medium", "Low" & "Very low" as illustrated in FIG. 2. The table of FIG. 2 represents corresponding traffic jam probability for possible permutations of the considered attributes using the subjective opinion of three different observers. That is, three human reviewers reviewed the test images and, using their subjective opinion, classified the traffic conditions present in the test images. The opinions of the observers is averaged. Other numbers of observers may be used to classify and/or annotate the test images (e.g., one, five, etc.).

Traffic density is linearly proportional to traffic jam probability while flow rate, collective velocity, and relative longitudinal distance are inversely proportional to traffic jam probability. That is, higher traffic density correlates to higher traffic jam probability while higher flow rate, collective velocity, and relative longitudinal distance correlate to lower traffic jam probability. The system, in some implementations, applies a linear regression technique to train the prediction model during the model training phase. After performing the linear regression technique, the system may perform a data transformation technique. For example, the system achieves data transformation using a three variable quadratic linear equation and model training with weighted least square fitting using QR (Orthogonal-triangular) decomposition algorithm respectively.

A predicted value y may be determined from Equation (5), where $x_1$ is the traffic density, $x_2$ is the flow rate, and $x_3$ is the collective velocity.

$$y = c_0 + c_1 * x_1 + c_2 * x_2 + c_3 * x_3 + c_4 * (x_1 * x_2) + c_5 * (x_1 * x_3) + c_6 * (x_2 * x_3) + c_7 * x_1^2 + c_0 * x_2^2 + c_9 * x_3^2 \quad (5)$$

Figure 3:
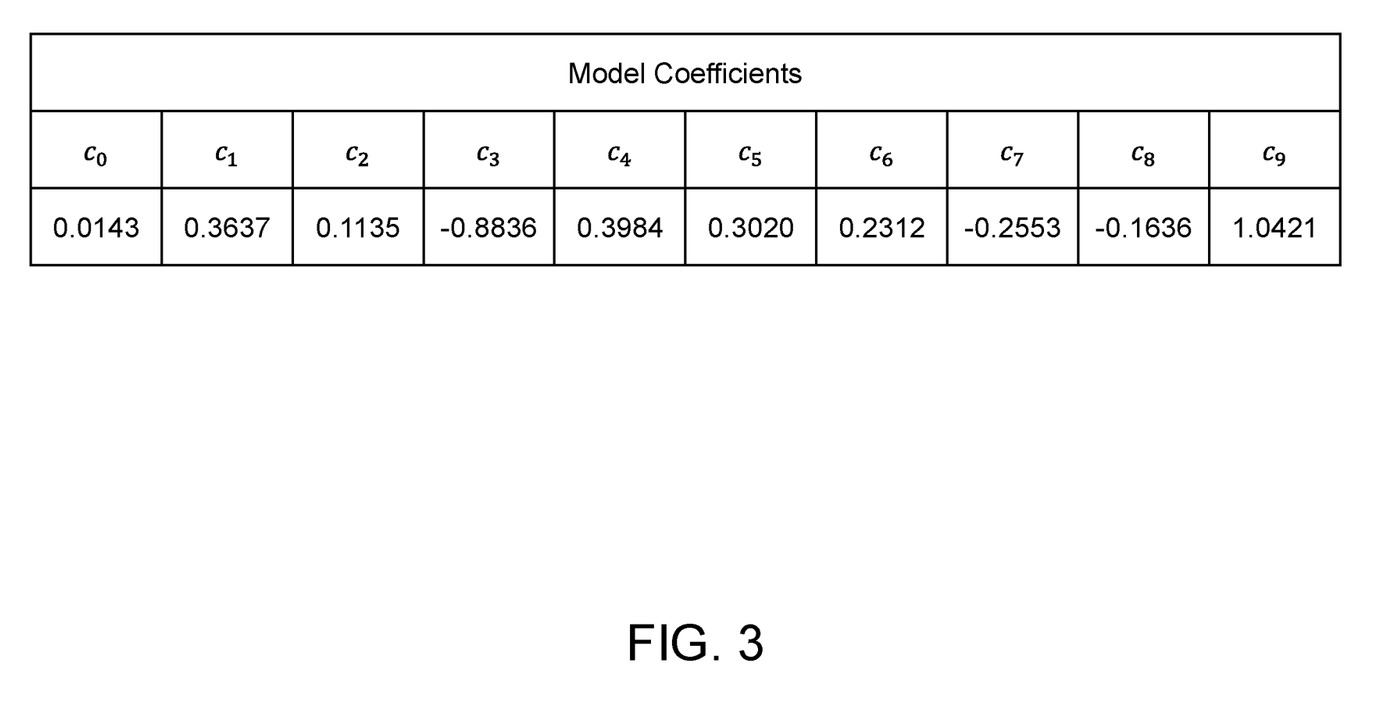
FIG. 3 is a table of exemplary prediction model coefficients.

The coefficients (i.e., $c_0$-$c_9$) are derived from the trained linear model. In some examples, the coefficients are equal to the values illustrated in FIG. 3. However, other coefficients may be used based on the model.

In another step, the system determines a traffic jam probability P by first determining a traffic jam probability for each individual lane $P_k$ in Equation (6), where $P_k$ is the traffic jam probability for the kth lane.

$$P_k = (1 - L_k) * f(D_k, F_k, V_k) \quad (6)$$

The function $f(D_k, F_k, V_k)$ is equivalent to y from Equation (5). That is, the function is equivalent to the predicted output of the trained linear predication model.

After determining the traffic jam probability for each traffic lane, the total traffic jam probability P is determined using Equation (7), where K is the total number of traffic lanes.

$$P = \left(\frac{1}{k}\right) \sum_{k=1}^{K} P_k \qquad (7)$$

Figure 4:
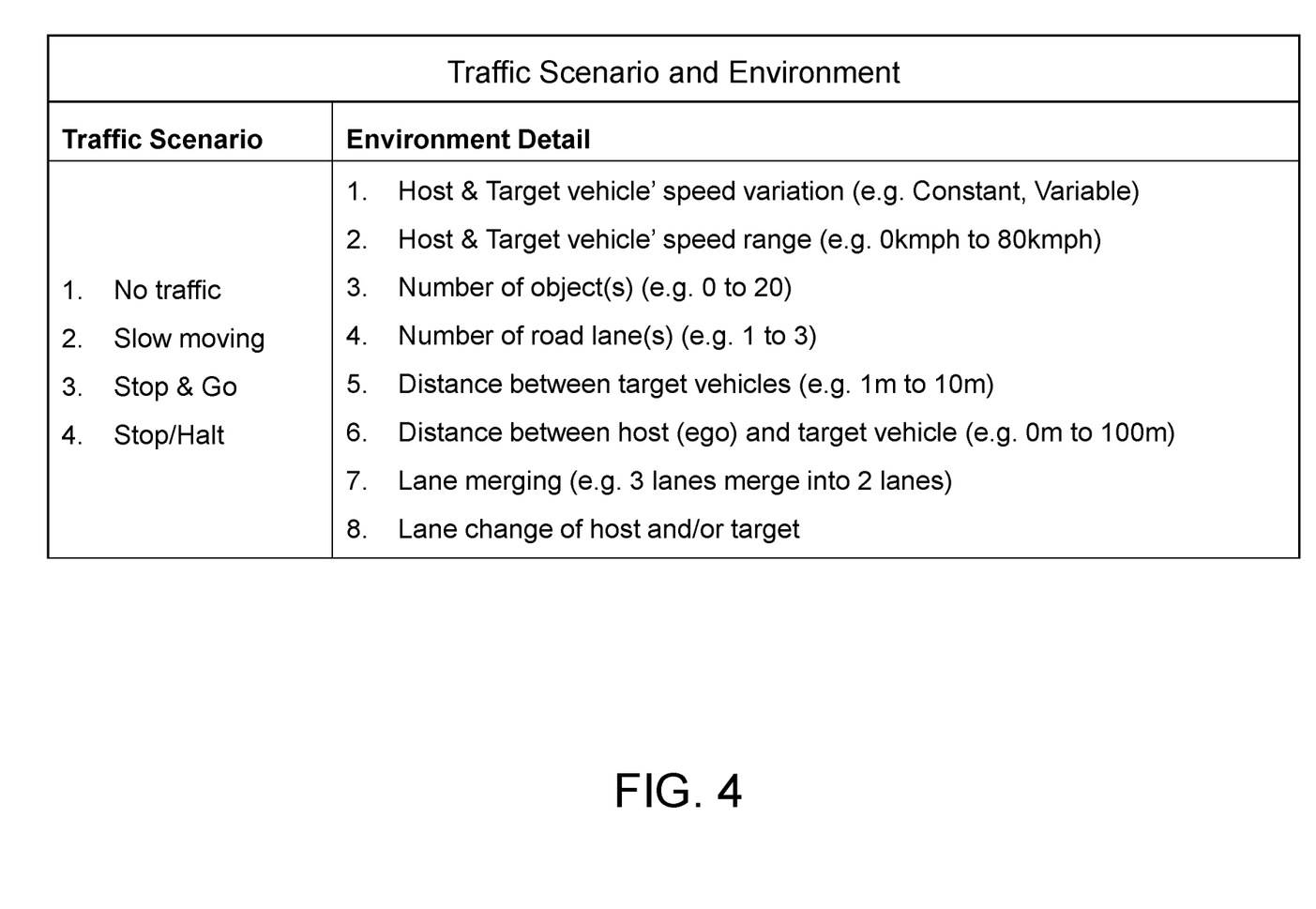
FIG. 4 is a table of exemplary traffic scenario and environmental testing parameters.

Referring now to FIG. 4, performance measurement conditions are illustrated. For example, a simulation tool for virtual test driving may simulate many (e.g., 25 or more) different possible traffic scenarios. Thus, the system is robust in a variety of traffic scenarios, such as variable speed between host and target vehicles, variable distance between host and target vehicles, variable number of target vehicles, and number of lanes.

Thus, the system determines real-time traffic jam probability using front sensor data (e.g. radar, lidar, and/or camera data) of the ego vehicle. Other target vehicles (i.e., other vehicles on the road) may be considered objects having certain details. The system uses a lane-wise object list that is determined from sensor data pre-processing. The object list includes details of each object (e.g., other vehicles on the road and in the field of sensing of the forward sensing sensor) such as the other vehicle's relative velocity and longitudinal distance with respect to ego vehicle and length of the object or other vehicle. The system, based on the determined traffic information in multiple traffic lanes of the road determines a traffic jam probability (a likelihood of greater traffic density and slow moving or stopped traffic) for each traffic lane, which may be used to select a traffic lane for the vehicle to travel along.

The traffic jam determination generated by the system may be used in a variety of autonomous driving applications, such as adaptive cruise control, lane keeping/change assist, automatic emergency breaking (AEB), vehicle navigation systems, and automated vehicle headlight control (i.e., selection of high/low beams). For example, responsive to determination of a lower traffic jam probability in a particular traffic lane (that is lower than the determined traffic jam probability in the traffic lane in which the vehicle is being driven), the autonomous driving system may maneuver the vehicle into that particular traffic lane to avoid the possible traffic jam (or to avoid a greater traffic jam) that may occur in the other traffic lane or traffic lanes. Optionally, the system may generate an output to a driver or occupant of the vehicle (such as via a display screen in the vehicle that is viewable by the driver) to alert the driver or occupant as to which traffic lane has the lower or lowest traffic jam probability (whereby the driver or occupant can control the vehicle to maneuver the vehicle into that traffic lane).

The system may communicate with other vehicles or infrastructure via, for example, a vehicle-to-vehicle or vehicle-to-infrastructure communication system. The system may communicate traffic parameters or traffic jam probability to other vehicles or infrastructure. For example, the system may provide traffic data and/or traffic jam probabilities to other vehicles travelling behind the vehicle to provide additional notice to the other vehicles. Likewise, the system may receive traffic data and/or traffic parameters and/or traffic jam probabilities from systems of other vehicles and may adjust the determination of the traffic jam probability appropriately. For example, the system may determine the traffic jam probability of each traffic lane (and/or of the road) ahead of the vehicle based in part on the communications (including either traffic data or determined traffic jam probabilities) received from other vehicles or from infrastructure, and the system may provide an operator of the vehicle advanced warning of a probability of an upcoming traffic jam based at least in part on information received from the other vehicle or vehicles or infrastructure (and optionally the equipped vehicle may be autonomously controlled to maneuver toward and into the particular traffic lane that has a lower determined traffic jam probability ahead of the equipped vehicle).

For autonomous vehicles suitable for deployment with the system of the present invention, an occupant of the vehicle may, under particular circumstances, be desired or required to take over operation/control of the vehicle and drive the vehicle so as to avoid potential hazard for as long as the autonomous system relinquishes such control or driving. Such occupant of the vehicle thus becomes the driver of the autonomous vehicle. As used herein, the term "driver" refers to such an occupant, even when that occupant is not actually driving the vehicle, but is situated in the vehicle so as to be able to take over control and function as the driver of the vehicle when the vehicle control system hands over control to the occupant or driver or when the vehicle control system is not operating in an autonomous or semi-autonomous mode.

Typically an autonomous vehicle would be equipped with a suite of sensors, including multiple machine vision cameras deployed at the front, sides and rear of the vehicle, multiple radar sensors deployed at the front, sides and rear of the vehicle, and/or multiple lidar sensors deployed at the front, sides and rear of the vehicle. Typically, such an autonomous vehicle will also have wireless two way communication with other vehicles or infrastructure, such as via a car2car (V2V) or car2x communication system.

The camera or sensor may comprise any suitable camera or sensor. Optionally, the camera may comprise a "smart camera" that includes the imaging sensor array and associated circuitry and image processing circuitry and electrical connectors and the like as part of a camera module, such as by utilizing aspects of the vision systems described in International Publication Nos. WO 2013/081984 and/or WO 2013/081985, which are hereby incorporated herein by reference in their entireties.

The system may include an image processor operable to process image data captured by the camera or cameras, such as for detecting objects or other vehicles or pedestrians or the like in the field of view of one or more of the cameras. For example, the image processor may comprise an image processing chip selected from the EYEQ family of image processing chips available from Mobileye Vision Technologies Ltd. of Jerusalem, Israel, and may include object detection software (such as the types described in U.S. Pat. Nos. 7,855,755; 7,720,580 and/or 7,038,577, which are hereby incorporated herein by reference in their entireties), and may analyze image data to detect vehicles and/or other objects. Responsive to such image processing, and when an object or other vehicle is detected, the system may generate an alert to the driver of the vehicle and/or may generate an overlay at the displayed image to highlight or enhance display of the detected object or vehicle, in order to enhance the driver's awareness of the detected object or vehicle or hazardous condition during a driving maneuver of the equipped vehicle.

The vehicle may include any type of sensor or sensors, such as imaging sensors or radar sensors or lidar sensors or ultrasonic sensors or the like. The imaging sensor or camera may capture image data for image processing and may comprise any suitable camera or sensing device, such as, for example, a two dimensional array of a plurality of photosensor elements arranged in at least 640 columns and 480 rows (at least a 640×480 imaging array, such as a megapixel imaging array or the like), with a respective lens focusing images onto respective portions of the array. The photosensor array may comprise a plurality of photosensor elements arranged in a photosensor array having rows and columns. Preferably, the imaging array has at least 300,000 photosensor elements or pixels, more preferably at least 500,000 photosensor elements or pixels and more preferably at least 1 million photosensor elements or pixels. The imaging array may capture color image data, such as via spectral filtering at the array, such as via an RGB (red, green and blue) filter or via a red/red complement filter or such as via an RCC (red, clear, clear) filter or the like. The logic and control circuit of the imaging sensor may function in any known manner, and the image processing and algorithmic processing may comprise any suitable means for processing the images and/or image data.

Optionally, the camera may comprise a forward viewing camera, such as disposed at a windshield electronics module (WEM) or the like. The forward viewing camera may utilize aspects of the systems described in U.S. Pat. Nos. 9,896,039; 9,871,971; 9,596,387; 9,487,159; 8,256,821; 7,480,149; 6,824,281 and/or 6,690,268, and/or U.S. Publication Nos. US-2015-0327398; US-2015-0015713; US-2014-0160284; US-2014-0226012 and/or US-2009-0295181, which are all hereby incorporated herein by reference in their entireties.

The system may utilize sensors, such as radar or lidar sensors or the like. The sensing system may utilize aspects of the systems described in U.S. Pat. Nos. 9,753,121; 9,689,967; 9,599,702; 9,575,160; 9,146,898; 9,036,026; 8,027,029; 8,013,780; 6,825,455; 7,053,357; 7,408,627; 7,405,812; 7,379,163; 7,379,100; 7,375,803; 7,352,454; 7,340,077; 7,321,111; 7,310,431; 7,283,213; 7,212,663; 7,203,356; 7,176,438; 7,157,685; 6,919,549; 6,906,793; 6,876,775; 6,710,770; 6,690,354; 6,678,039; 6,674,895 and/or 6,587,186, and/or International Publication Nos. WO 2018/007995 and/or WO 2011/090484, and/or U.S. Publication Nos. US-2018-0231635; US-2018-0045812; US-2018-0015875; US-2017-0356994; US-2017-0315231; US-2017-0276788; US-2017-0254873; US-2017-0222311 and/or US-2010-0245066, which are hereby incorporated herein by reference in their entireties.

The system may also communicate with other systems, such as via a vehicle-to-vehicle communication system or a vehicle-to-infrastructure communication system or the like. Such car2car or vehicle to vehicle (V2V) and vehicle-to-infrastructure (car2X or V2X or V2I or a 4G or 5G broadband cellular network) technology provides for communication between vehicles and/or infrastructure based on information provided by one or more vehicles and/or information provided by a remote server or the like. Such vehicle communication systems may utilize aspects of the systems described in U.S. Pat. Nos. 6,690,268; 6,693,517 and/or 7,580,795, and/or U.S. Publication Nos. US-2014-0375476; US-2014-0218529; US-2013-0222592; US-2012-0218412; US-2012-0062743; US-2015-0251599; US-2015-0158499; US-2015-0124096; US-2015-0352953; US-2016-0036917 and/or US-2016-0210853, which are hereby incorporated herein by reference in their entireties.

Changes and modifications in the specifically described embodiments can be carried out without departing from the principles of the invention, which is intended to be limited only by the scope of the appended claims, as interpreted according to the principles of patent law including the doctrine of equivalents.

The invention claimed is:

1. A vehicular driving assist system, the vehicular driving assist system comprising:
    at least one sensor disposed at a vehicle equipped with the vehicular driving assist system, the at least one sensor having a field of sensing exterior and at least forward of the equipped vehicle, the at least one sensor capturing sensor data;
    an electronic control unit (ECU) comprising electronic circuitry and associated software;
    wherein the electronic circuitry of the ECU comprises a data processor for processing sensor data captured by the at least one sensor to detect presence of objects in the field of sensing of the at least one sensor;
    wherein the ECU, responsive to processing by the data processor at the ECU of sensor data captured by the at least one sensor, determines traffic attributes for each traffic lane of a plurality of traffic lanes forward of the equipped vehicle on a road along which the equipped vehicle is travelling;
    wherein the ECU, responsive to determining the traffic attributes, determines a predicted traffic value based on (i) the traffic attributes and (ii) a model output from a trained traffic prediction model;
    wherein the ECU, responsive to determining the predicted traffic value, determines a traffic jam probability for each traffic lane of the road ahead of the equipped vehicle based on the predicted traffic value and the respective traffic attributes;
    wherein the ECU determines a traffic lane of the plurality of traffic lanes with the lowest traffic jam probability; and
    wherein the ECU generates an output based on the determination of the traffic lane with the lowest determined traffic jam probability, and wherein the output comprises one selected from the group consisting of (i) a notification to a driver of the vehicle of the traffic lane with the lowest determined traffic jam probability and (ii) a command to maneuver the vehicle into the traffic lane with the lowest determined traffic jam probability.

2. The vehicular driving assist system of claim 1, wherein the trained traffic prediction model comprises a trained linear regression prediction model.

3. The vehicular driving assist system of claim 1, wherein the traffic attributes comprise at least one selected from the group consisting of (i) traffic density, (ii) traffic flow rate, (iii) traffic collective velocity and (iv) traffic normalized longitudinal distance.

4. The vehicular driving assist system of claim 1, wherein the trained traffic prediction model is trained on annotated data, and wherein the annotated data is categorized into traffic scenarios.

5. The vehicular driving assist system of claim 4, wherein the traffic scenarios comprise at least two selected from the group consisting of (i) no traffic, (ii) slow moving traffic, (iii) stop and go traffic and (iv) stopped traffic.

6. The vehicular driving assist system of claim 4, wherein the annotated data comprises subjective observations from at least one traffic observer.

7. The vehicular driving assist system of claim 1, wherein the ECU performs data transformation on the model output from the trained traffic prediction model, and wherein the data transformation comprises a multi-variable quadratic linear equation.

8. The vehicular driving assist system of claim 7, wherein the multi-variable quadratic linear equation comprises a three variable quadratic linear equation.

9. The vehicular driving assist system of claim 1, wherein the trained traffic prediction model is trained with weight least square fitting using an orthogonal-triangular decomposition algorithm.

10. The vehicular driving assist system of claim 1, wherein the ECU, responsive to determining the traffic jam probability for each traffic lane ahead of the equipped vehicle, determines an overall traffic jam probability for the road ahead of the equipped vehicle.

11. The vehicular driving assist system of claim 10, wherein the ECU determines the overall traffic jam probability from an average traffic jam probability of each traffic lane of the road.

12. The vehicular driving assist system of claim 1, wherein the ECU determines the traffic jam probability for each traffic lane based at least in part on (i) a vehicle-to-vehicle communication from another vehicle forward of the equipped vehicle or (ii) a vehicle-to-infrastructure communication from infrastructure forward of the equipped vehicle.

13. The vehicular driving assist system of claim 1, wherein the output comprises the command to maneuver the equipped vehicle into the traffic lane with the lowest determined traffic jam probability.

14. The vehicular driving assist system of claim 1, wherein the at least one sensor comprises at least one forward viewing camera.

15. The vehicular driving assist system of claim 1, wherein the at least one sensor comprises at least one forward sensing radar sensor.

16. The vehicular driving assist system of claim 1, wherein the at least one sensor comprises at least one forward sensing lidar sensor.

17. The vehicular driving assist system of claim 1, wherein the ECU determines the traffic jam probability for each traffic lane based on the predicted traffic value, the respective traffic attributes, and a traffic normalized longitudinal distance.

18. A vehicular driving assist system, the vehicular driving assist system comprising:
   at least one sensor disposed at a vehicle equipped with the vehicular driving assist system, wherein the at least one sensor comprises at least one camera, and wherein the at least one sensor has a field of sensing exterior and at least forward of the equipped vehicle, the at least one sensor capturing sensor data;
   an electronic control unit (ECU) comprising electronic circuitry and associated software;
   wherein the electronic circuitry of the ECU comprises a data processor for processing sensor data captured by the at least one sensor to detect presence of objects in the field of sensing of the at least one sensor;
   wherein the ECU, responsive to processing by the data processor at the ECU of sensor data captured by the at least one sensor, determines traffic attributes for each traffic lane of a plurality of traffic lanes forward of the equipped vehicle on a road along which the equipped vehicle is travelling;
   wherein the traffic attributes comprise at least two selected from the group consisting of (i) traffic density, (ii) traffic flow rate, (iii) traffic collective velocity and (iv) traffic normalized longitudinal distance;
   wherein the ECU, responsive to determining the traffic attributes, determines a predicted traffic value based on (i) the traffic attributes and (ii) a model output from a trained traffic prediction model;
   wherein the ECU, responsive to determining the predicted traffic value, determines a traffic jam probability for each traffic lane of the road ahead of the equipped vehicle based on the predicted traffic value and the respective traffic attributes;
   wherein the ECU determines a traffic lane of the plurality of traffic lanes with the lowest traffic jam probability; and
   wherein the ECU generates an output based on the determination of the traffic lane with the lowest determined traffic jam probability, and wherein the output comprises one selected from the group consisting of (i) a notification to a driver of the vehicle of the traffic lane with the lowest determined traffic jam probability and (ii) a command to maneuver the vehicle into the traffic lane with the lowest determined traffic jam probability.

19. The vehicular driving assist system of claim 18, wherein the at least one sensor further comprises at least one radar sensor.

20. The vehicular driving assist system of claim 18, wherein the ECU, responsive to determining the traffic jam probability for each traffic lane ahead of the equipped vehicle, determines an overall traffic jam probability for the road ahead of the equipped vehicle.

21. The vehicular driving assist system of claim 18, wherein the ECU determines the traffic jam probability for each traffic lane based at least in part on (i) a vehicle-to-vehicle communication from another vehicle forward of the equipped vehicle or (ii) a vehicle-to-infrastructure communication from infrastructure forward of the equipped vehicle.

22. The vehicular driving assist system of claim 18, wherein the output comprises the command to maneuver the equipped vehicle into the traffic lane with the lowest determined traffic jam probability.

23. A vehicular driving assist system, the vehicular driving assist system comprising:
   at least one sensor disposed at a vehicle equipped with the vehicular driving assist system, wherein the at least one sensor comprises at least one selected from the group consisting of (i) at least one lidar sensor and (ii) at least one radar sensor, and wherein the at least one sensor has a field of sensing exterior and at least forward of the equipped vehicle, the at least one sensor capturing sensor data;
   an electronic control unit (ECU) comprising electronic circuitry and associated software;
   wherein the electronic circuitry of the ECU comprises a data processor for processing sensor data captured by the at least one sensor to detect presence of objects in the field of sensing of the at least one sensor;
   wherein the ECU, responsive to processing by the data processor at the ECU of sensor data captured by the at least one sensor, determines traffic attributes for each traffic lane of a plurality of traffic lanes forward of the equipped vehicle on a road along which the equipped vehicle is travelling;
   wherein the traffic attributes comprise at least two selected from the group consisting of (i) traffic density, (ii) traffic flow rate, (iii) traffic collective velocity and (iv) traffic normalized longitudinal distance;
   wherein the ECU, responsive to determining the traffic attributes, determines a predicted traffic value based on (i) the traffic attributes and (ii) a model output from a trained traffic prediction model;

wherein the ECU, responsive to determining the predicted traffic value, determines a traffic jam probability for each traffic lane of the road ahead of the equipped vehicle based on the predicted traffic value and the respective traffic attributes;

wherein the ECU determines a traffic lane of the plurality of traffic lanes with the lowest traffic jam probability; and wherein the ECU generates an output based on the determination of the traffic lane with the lowest determined traffic jam probability, and wherein the output comprises one selected from the group consisting of (i) a notification to a driver of the vehicle of the traffic lane with the lowest determined traffic jam probability and (ii) a command to maneuver the vehicle into the traffic lane with the lowest determined traffic jam probability.

24. The vehicular driving assist system of claim 23, wherein the at least one sensor comprises the at least one radar sensor.

25. The vehicular driving assist system of claim 23, wherein the at least one sensor comprises the at least one lidar sensor.

26. The vehicular driving assist system of claim 23, wherein the at least one sensor further comprises at least one camera.

27. The vehicular driving assist system of claim 23, wherein the ECU, responsive to determining the traffic jam probability for each traffic lane ahead of the equipped vehicle, determines an overall traffic jam probability for the road ahead of the equipped vehicle.

28. The vehicular driving assist system of claim 23, wherein the ECU determines the traffic jam probability for each traffic lane based at least in part on (i) a vehicle-to-vehicle communication from another vehicle forward of the equipped vehicle or (ii) a vehicle-to-infrastructure communication from infrastructure forward of the equipped vehicle.

29. The vehicular driving assist system of claim 23, wherein the output comprises the command to maneuver the equipped vehicle into the traffic lane with the lowest determined traffic jam probability.

* * * * *

UNITED STATES PATENT AND TRADEMARK OFFICE
CERTIFICATE OF CORRECTION

| | | |
|---|---|---|
| PATENT NO. | : 12,371,027 B2 | Page 1 of 1 |
| APPLICATION NO. | : 16/947867 | |
| DATED | : July 29, 2025 | |
| INVENTOR(S) | : Jigneshkumar Natvarlal Vasoya et al. | |

It is certified that error appears in the above-identified patent and that said Letters Patent is hereby corrected as shown below:

In the Specification

<u>Column 4</u>
Lines 56-58:
" $y = c_0 + c_1 * x_1 + c_2 * x_2 + c_3 * x_3 + c_4 * (x_1 * x_2) + c_5 * (x_1 * x_3) + c_6 * (x_2 * x_3) + c_7 * x_1^2 + c_0 * x_2^2 + c_9 * x_3^2$ "

Should be:
-- $y = c_0 + c_1 * x_1 + c_2 * x_2 + c_3 * x_3 + c_4 * (x_1 * x_2) + c_5 * (x_1 * x_3) + c_6 * (x_2 * x_3) + c_7 * x_1^2 + c_8 * x_2^2 + c_9 * x_3^2$ --

Signed and Sealed this
Twenty-sixth Day of August, 2025

Coke Morgan Stewart
*Acting Director of the United States Patent and Trademark Office*